LYON & HOPKINS.
Broom Machine.

No. 62,548. Patented March 5, 1867.

Witnesses:
Newton Hopkins
H. A. Washburn

Inventors:
H. B. Lyon
Geo. M. Hopkins

United States Patent Office.

HENRY B. LYON AND GEORGE M. HOPKINS, OF ALBION, NEW YORK.

Letters Patent No. 62,548, dated March 5, 1867.

---

IMPROVED CLAMP FOR MAKING BROOMS.

---

The Schedule referred to in these Letters Patent and making part of the same.

---

TO ALL WHOM IT MAY CONCERN:

Be it known that we HENRY B. LYON and GEORGE M. HOPKINS, both of Albion, in the county of Orleans, in the State of New York, have invented a new and useful improvement in Implements for Making Brooms; and we do hereby declare that the following is a full, clear, and exact description of the construction and operation of the same, reference being had to the accompanying drawings, and to the letters of reference marked thereon.

The object of our invention is to furnish a cheap and convenient implement for making brooms. We will proceed to describe its construction and operation.

Figure 1:
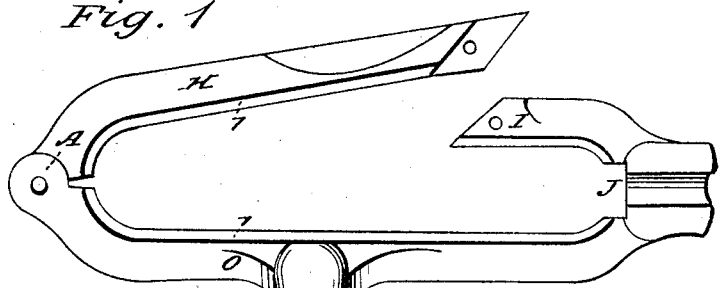
Figure 1 represents the jointed frame O, showing the joint A open.
Figure 2:
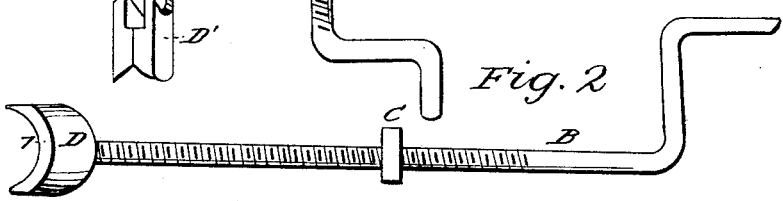
Figure 2 represents the screw B, the nut C, and the follower D.
Figure 4:
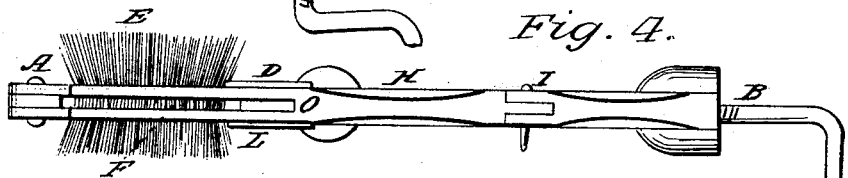
Figure 4 shows the corn E, as compressed, and the slot F.
Figure 5:
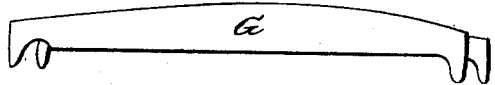
Figure 5 represents the shell or follower G.
Figure 6:
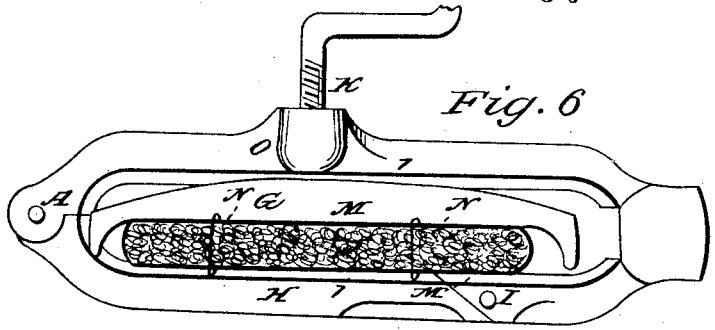
Figure 6 shows the corn E as compressed flatwise.

The implement is of iron or other suitable material. The inner edges 1 1 are parallel. The end A is in the form of a half ellipse. The inner edges are bevelled down to slot F, which is shown in fig. 4. At A, in fig. 1, a joint will be seen, by means of which the part designated by H is allowed to open or shut. At I is a hole, for the reception of a pin, to keep it shut. J represents a recess for holding the screw B and the nut C. K represents a screw, which operates on the shell G, as shown in fig. 6. The follower D, in fig. 2, is bevelled at 1, and is a half ellipse in form on that edge. L designates a transverse groove corresponding to the slot F, (see fig. 4.) The follower D is riveted loosely on to the screw B. Both screws, B and K, are formed into a crank at the outer end for convenience in working.

Figure 3:
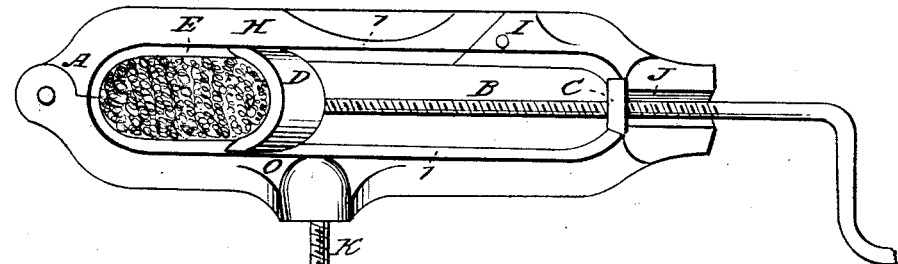
Figure 3 shows the position of the corn E when compressed.

The manner of using the implement is as follows: The part H is opened, the follower D is placed in the extreme right end of the jointed frame O, the corn is laid in, and the part H is closed and fastened. The follower D is pushed down as far as possible, when the nut C is slipped into the recess J, when it appears as shown in fig. 3. The screw is now turned until the corn is sufficiently compressed, when the wire is placed around it through the slot F, sufficient room being left each side of the corn in the slot to allow the wire to pass, (see fig. 4.) The brush can now be taken out, and the handle driven in. The follower D is taken out of the jointed frame O, and the shell G is put in. The wire M is put on the brush, and the broom is placed on the shell G. The part H is closed and fastened. The broom is now compressed flatwise by means of the screw K. The hooks N N are placed through the corn, and bent over the wire M.

What we claim as new, and desire to secure by Letters Patent, is—

The screw B, the follower D, and the recess J, in combination with the jointed frame O, having the slot F, the screw K, and the clamp G, as and for the purpose specified.

The above specification of our invention signed by us this 28th day of January, 1867.

HENRY B. LYON,
GEO. M. HOPKINS.

Witnesses:
NEWTON HOPKINS,
H. A. WASHBURN.